United States Patent Office 3,284,401
Patented Nov. 8, 1966

3,284,401
STABILIZED RUBBER, OLEFIN POLYMER OR VINYL CHLORIDE POLYMER COMPOSITIONS CONTAINING 1,2-DITHIOLE-3-THIONES
Sheila Ann Evans, nee Hughes, Oswestry, England, and Ernest Bryson McCall, Llangollen, Wales, assignors to Monsanto Company, a corporation of Delaware
No Drawing. Filed Nov. 27, 1962, Ser. No. 240,416
Claims priority, application Great Britain, Dec. 29, 1961, 46,627/61
6 Claims. (Cl. 260—45.8)

This invention relates to novel rubber and plastic compositions having improved resistance to oxidation.

It is known that rubbers and thermoplastic polymers are liable to deteriorate under conditions of normal use, and that to a large extent this deterioration is due to the action of atmospheric oxygen. There are a number of substances which, when incorporated into rubber or plastic, confer on it a certain measure of protection against the action of oxygen; the use of such a substance (termed an antioxidant) in the production of rubber and plastic articles is therefore a general practice.

It has now been discovered that a certain group of chemical compounds, the 1,2-dithiole-3-thiones, show a superior degree of antioxidant activity in rubber and thermoplastic polymers.

Accordingly, the present invention comprises rubber or thermoplastic polymer in which there is incorporated a 1,2-dithiole-3-thione, that is to say a compound containing the structure:

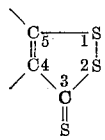

The invention also includes a process for the production of stabilized rubber or plastic compositions having improved resistance to deterioration where a 1,2-dithiole-3-thione is incorporated into the compositions prior to working or vulcanization and the mixture is subsequently worked or vulcanized.

In the 1,2-dithiole-3-thione, each of the carbon atoms in positions 4- and 5- can be linked to an atom or group selected from a wide range, including, for instance, hydrogen and halogen atoms, amino, substituted amino, hydroxy, mercapto, aliphatic, and aromatic groups. An aliphatic group can be, for instance, an alkyl group, such as methyl, ethyl, hexyl or dodecyl; a cycloalkyl group, such as cyclohexyl; an aralkyl group, such as benzyl; or an alkoxy group, such as methoxy or ethoxy. An aromatic group can be, for instance, ether an aryl group, such as phenyl, tolyy or naphthyl, or a heterocyclic aromatic group, such as pyridyl.

The useful 1,2-dithiole-3-thiones also include those where carbon atoms 4 and 5 in the above formula are both members of a second ring of atoms to which the 1,2-dithiole-3-thione ring is fused. Where this is so, the second ring is usually aromatic (including heterocyclic aromatic) but it can be hydroaromatic.

The preferred compounds of the type where carbon atoms 4 and 5 are each linked to a separate atom or group are in general monoaryl-1,2-dithiole-3-thiones, and in particular 5-aryl-1, 2-dithiole-3-thiones. These include instances where the aryl group is a phenyl or substituted phenyl group, in which a substituent can be, for example, a halogen atom, such as chlorine or bromine; an alkoxy group, such as a methoxy, ethoxy or isopropoxy group; a nitro group, an amino group; or an alkylamino group; such as an ethylamino or dimethylamino group.

Preferred instances of compounds where a second ring of atoms is fused to the 1,2-dithiole-3-thione ring are in general benzo-1,2-thiole-3-thiones. The benzo ring can optionally contain a substituent, selected, for example, from any of these specified in the last foregoing paragraph with reference to a substituted phenyl group.

Specific examples of the 1,2-dithiole-3-thiones which are useful in rubber and plastic are:

5-n-tetradecyl-1,2-dithiole-3-thione;
5-phenyl-1,2-dithiole-3-thione;
5-o-tolyl-1,2-dithiole3-thione;
5(p-chlorophenyl)-1,2-dithiole-3-thione;
5(p-methoxyphenyl)-1,2-dithiole-3-thione;
4(o-ethoxyphenyl)-1,2-dithiole-3-thione;
5(m-nitrophenyl)-1,2-dithiole-3-thione;
4(p-dimethylaminophenyl)-1,2-dithiole-3-thione:
benzo-1,2-dithiole-3-thione;
5-ethoxybenzo-1,2-dithiole-3-thione; and
7-nitrobenzo-1,2-dithiole-3-thione.

The 1,2-dithiole-3-thiones are effective antioxidants for both natural and synthetic rubber, as well as thermoplastic polymers. Synthetic rubbers which can be used include polymers of 1,3-butadienes, for instance, 1,3-butadiene itself and isoprene, copolymers of 1,3-butadienes with other monomers, such as styrene, acrylonitrile, isobutylene or methyl methacrylate, and polyolefin rubbers, for instance, ethylene-propylene and ethylene-vinyl acetate copolymers. The materials are stabilizers for synthetic rubber, and when used for this purpose can be addd in aqueous dispersion to the rubber latex. Other materials in which the 1,2-dithiole-3-thione may be incorporated to serve as effective antioxidants are thermoplastic materials such as polymers of olefins such as ethylene, propylene, and other alpha olefins up to about 8 carbon atoms, including copolymers thereof, and vinyl chloride polymers.

The amount of the antioxidant used in the rubber or plastic can vary between wide limits, but in general it has been found preferable to use from 0.2 to 3 parts by weight, and particularly from 0.5 to 2 parts by weight, per hundred parts by weight of rubber of plastic. Amounts somewhat outside these limits can sometimes be employed, for instance, from 0.1 to 5 parts of the additive per 100 parts of rubber or plastic. Very satisfactory results have been obtained using about 1.5 parts by weight of the 1,2-dithiole-3-thione per hundred parts by weight of rubber. The 1,2-dithiole-3-thione can be incorporated into the rubber or plastic by conventional means, using for example a roll mill or an internal mixer.

In the process for the production of vulcanized rubber having improved resistance to deterioration, other commonly used ingredients, such as for instance, zinc oxide, stearic acid, a filler, a vulcanizing agent and a vulcanization accelerator will also normally be incorporated into the rubber prior to vulcanization. The vulcanization proper, in which the compounded mixture is heated, is carried out at a temperature appropriate to the particular rubber concerned, for example, at a temperature of about 135° C. to 155° C. where the composition is based on natural rubber, or at a temperature of about 140° C. to 160° C. where the composition is based on a styrene-butadiene rubber and an ethylene-propylene rubber or an ethylene-vinyl acetate rubber.

The invention is illustrated by the following example.

*Example*

This example illustrates the use of 5-phenyl-1,2-dithiole-3-thione and 5(p-methoxyphenyl)-1,2-dithiole-3-thione as anti-oxidants in a white rubber stock.

ing the appropriate quantities of sulphur, diphenylguanidine and 5(p-methoxyphenyl)-1,2-dithiole-3-thione into a second portion of the masterbatch. Similar measurements were made on a third set of eight bands containing no antioxidant.

The results are given in the following table.

| Antioxidant | Stress in pounds required to extend band to 1½ times original length | | | | | | | Percent original stress retained after 48 hours | |
|---|---|---|---|---|---|---|---|---|---|
| | Before aging | After aging for— | | | | | | | |
| | | 8 hours | | 24 hours | | 48 hours | | Stressed during aging | Unstressed during aging |
| | | Stressed during aging | Unstressed during aging | Stressed during aging | Unstressed during aging | Stressed during aging | Unstressed during aging | | |
| 5-phenyl-1,2-dithiole-3-thione | 1.08 | 1.14 | 0.91 | 1.15 | 0.77 | 1.20 | 0.64 | 111 | 59 |
| 5(p-methoxyphenyl)-1,2-dithiole-3-thione | 1.21 | 1.26 | 0.97 | 1.28 | 0.84 | 1.29 | 0.67 | 106 | 55 |
| None | 1.16 | 1.05 | 0.77 | 0.95 | 0.48 | 0.79 | 0.18 | 68 | 15.5 |

In the following test, the effectiveness of the antioxidant was assessed by its ability to retard the rate at which the stress required to produce a given extension in a sample of rubber decreased while the rubber was subjected to attack by atmospheric oxygen at an elevated temperature. Measurements were made on a sample which was unstressed during the exposure to atmospheric oxygen and on a sample which was stressed, the rate of decrease being dependent on the tension in the rubber irrespective of the presence or absence of an antioxidant.

A masterbatch of the following compositions was compounded on a laboratory mill.

|  | Parts by weight |
|---|---|
| Pale crepe natural rubber | 100 |
| Zinc oxide | 5 |
| Stearic acid | 1 |
| Blanc fixe pigment | 50 |
| Titanium dioxide | 5 |

A portion of the masterbatch was taken, and into it were milled sulphur, diphenylguanidine, and 5-phenyl-1,2-dithiole-3-thione in the proportions by weight of 2.5, 1.0, and 1.5, respectively, per 100 parts by weight of rubber.

Eight rectangular bands, each having side walls 79 mm. in length and 4 mm. x 1 mm. in cross section, and thickened end walls 11 mm. in length, were molded from the rubber stock by vulcanizing at 153° C. for 30 minutes.

The stress required to extend the bands in their original or "unaged" conditions to 1½ times their unstretched length was determined as an average of four measurements on each of two of the bands.

The remaining bands were placed in separate cells in an air oven at 90° C., three of the bands being supported so that except for its own weight each was unstressed, and three of the bands being extended over hooks so spaced that the bands were stressed by extending them 35 percent more than their original length.

After 8 hours, one unstressed and one stressed band were removed from the oven, and after cooling, the stress required to extend each to 1½ times its original length was measured. Similar measurements were made on two bands removed from the oven after 24 hours and on the remaining two bands which were removed after 48 hours.

Corresponding measurements were made on a second set of eight bands molded from a stock prepared by mill- It is apparent to those skilled in the art that the stress required to extend the unstressed bands containing 5-phenyl-1,2-dithiole-3-thione and those containing 5(p-methoxyphenyl)-1,2-dithiole-3-thione to 1½ times their unstretched length remained practically constant during the 48 hours of the test, whereas for the unstressed controll bands this stress fell to 68 percent of its original value over the same period. Where the bands were stressed during aging, the stress required to extend the bands to 1½ times their original length decreased during aging considerably more slowly when a 1,2-dithiole-3-thione was present than in its absence.

What is claimed is:

1. A process for the production of a composition chosen from the group consisting of natural rubber, hydrocarbon synthetic rubbers, olefin polymers, and vinyl chloride polymers having improved resistance to deterioration by oxygen which comprises incorporating into said composition prior to vulcanization a minor amount of 1,2-dithiole-3-thione.

2. The process of claim 1 wherein the 1,2-dithiole-3-thione is from 0.2 percent to about 3 percent by weight of the total composition.

3. The process of claim 2 wherein the 1,2-dithiole-3-thione is incorporated into the composition by means of a roll mill or an internal mixer.

4. An oxygen stabilized rubber composition comprising natural rubber and from 0.2 to 3.0 percent by weight of 5-phenyl-1,2-dithiole-3-thione as an antioxidant.

5. An oxygen stabilized rubber composition comprising natural rubber and from 0.2 to 3.0 percent by weight of 5(p-methoxyphenyl)-1,2-dithiole-3-thione as an antioxidant.

6. An oxygen-stabilized composition chosen from the group consisting of natural rubber, hydrocarbon synthetic rubbers, olefin polymers, and vinyl chloride polymers having incorporated therein as an antioxidant a minor amount of a 1,2-dithiole-3-thione chosen from the group consisting of monoaryl-1,2-dithiole-3-thiones and benzo-1,2-dithiole-3-thiones.

References Cited by the Examiner

UNITED STATES PATENTS 2,995,569    8/1961    Hamilton et al. _____ 260—45.8

LEON J. BERCOVITZ, *Primary Examiner.*

M. J. WELSH, *Assistant Examiner.*

UNITED STATES PATENT OFFICE
CERTIFICATE OF CORRECTION

Patent No. 3,284,401                                 November 8, 1966

Sheila Ann Evans nee Hughes et al.

It is hereby certified that error appears in the above numbered patent requiring correction and that the said Letters Patent should read as corrected below.

In the heading to the printed specification, lines 7 and 8, for "assignors to Monsanto Company, a corporation of Delaware" read -- assignors to Monsanto Chemicals Limited, London, England, a company of Great Britain --; column 1, line 54, for "tolyy" read -- tolyl --; column 4, lines 28 and 29, for "controll" read -- control --.

Signed and sealed this 3rd day of December 1968.

(SEAL)
Attest:

Edward M. Fletcher, Jr.                            EDWARD J. BRENNER

Attesting Officer                                       Commissioner of Patents